April 20, 1948. G. W. WILLARD 2,439,836
METHOD OF AND APPARATUS FOR LOCATING THE DIRECTION
OF NATURAL AXES OF A QUARTZ CRYSTAL SECTION
Filed Sept. 9, 1943 3 Sheets-Sheet 1
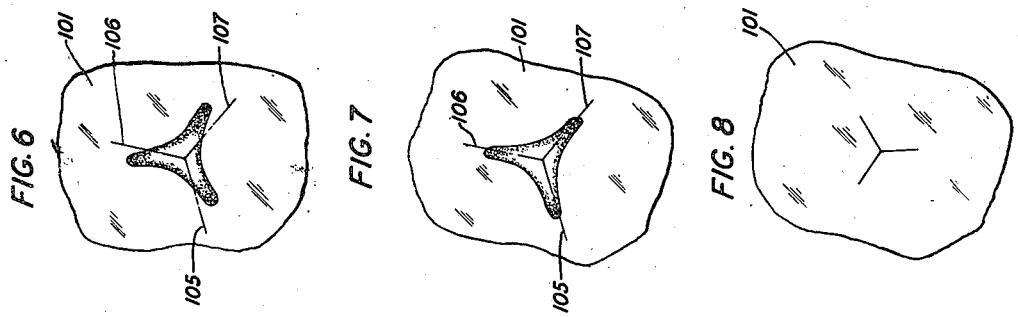
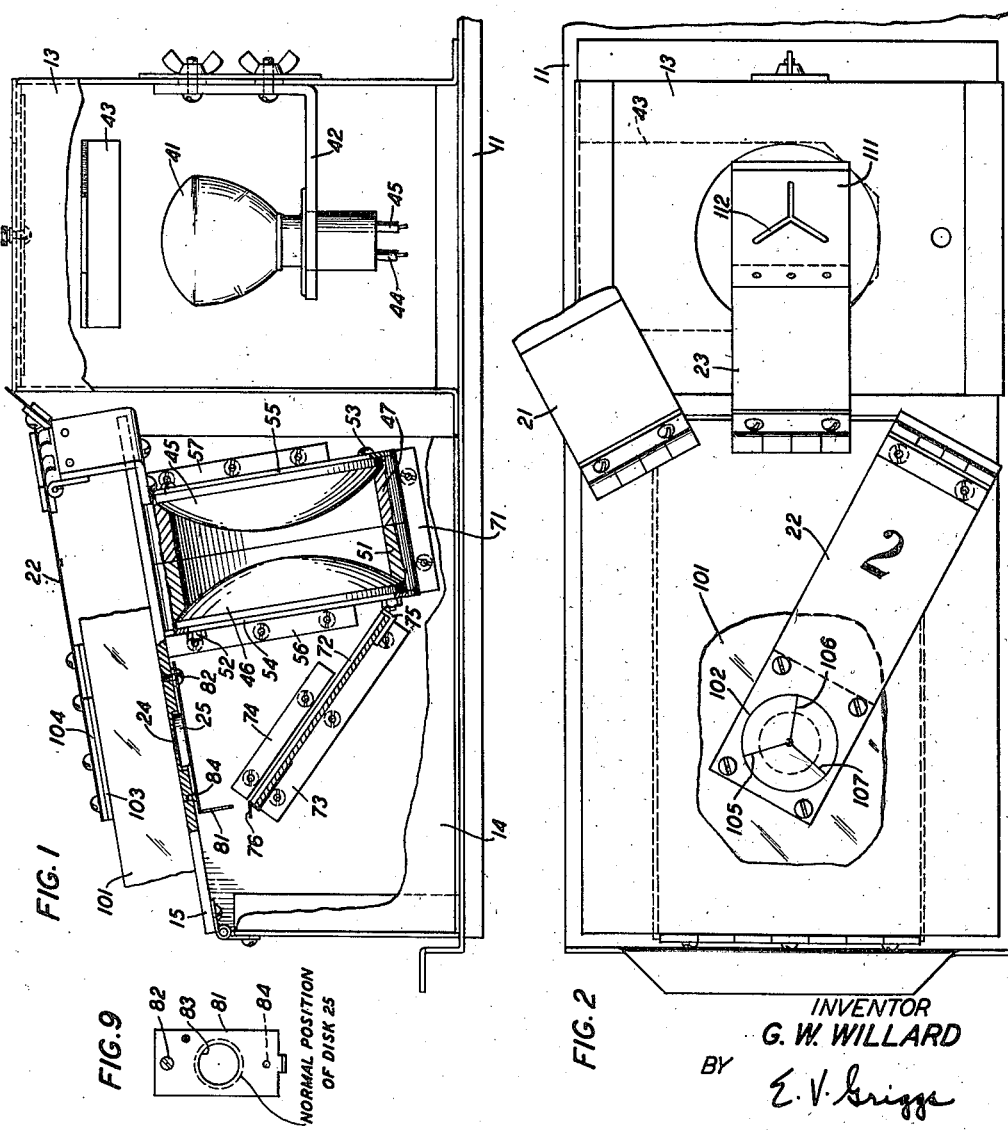
INVENTOR
G. W. WILLARD
BY
E. V. Griggs
ATTORNEY

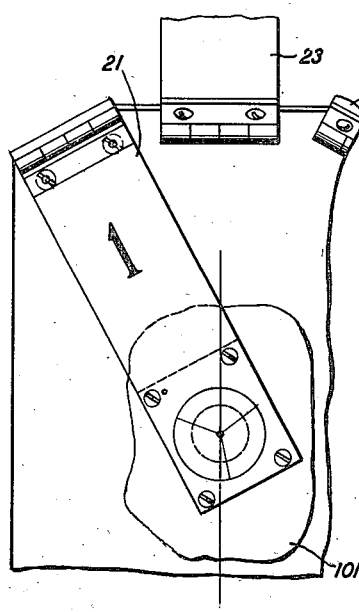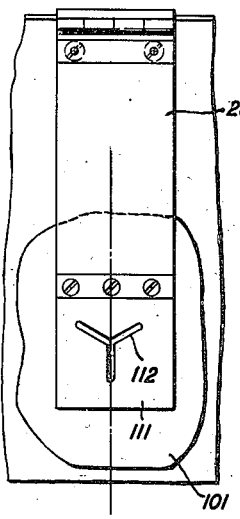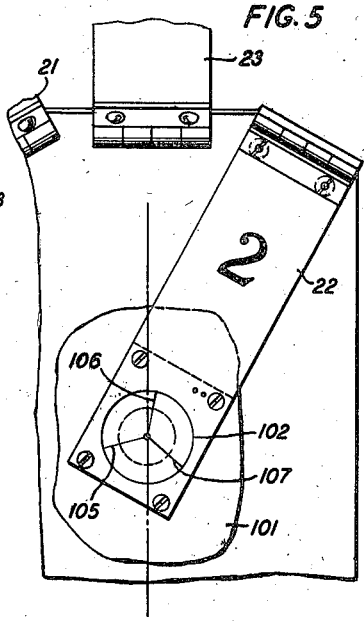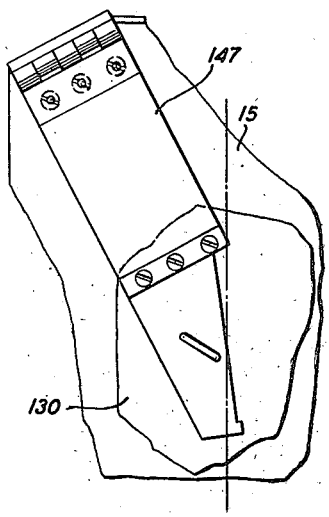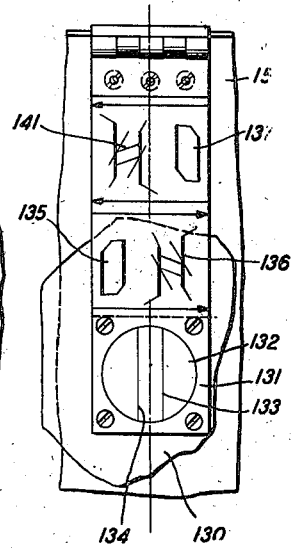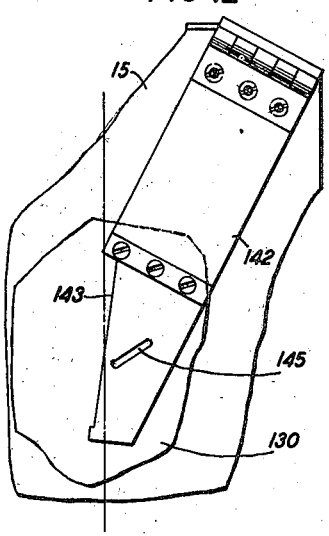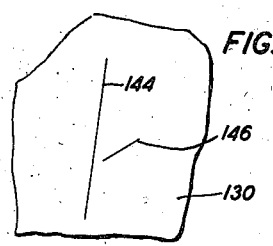

INVENTOR
G. W. WILLARD
BY
ATTORNEY

Patented Apr. 20, 1948

2,439,836

UNITED STATES PATENT OFFICE 2,439,836

METHOD OF AND APPARATUS FOR LOCATING THE DIRECTION OF NATURAL AXES OF QUARTZ CRYSTAL SECTIONS

Gerald W. Willard, Fanwood, N. J., assignor to Bell Telephone Laboratories, Incorporated, New York, N. Y., a corporation of New York Application September 9, 1943, Serial No. 501,619

3 Claims. (Cl. 88—14)

This invention relates to a method of and apparatus for testing and particularly to a method of and apparatus for testing quartz crystal sections.

An object of the invention is to facilitate the production of quartz piezoelectric plates.

A more specific object of the invention is to determine the direction in a section, slab or bar of quartz of certain of the natural crystallographic axes thereof as well as the electrical sense of certain of the axes.

Still another specific object of the invention is to determine the sense (±) of orientation of certain slabs or bars cut from a quartz mother crystal.

Yet another specific object of the invention is to determine the electrical sense of "X" cut quartz piezoelectric sections.

Raw quartz, from which quartz piezoelectric plates of the type now being used in increasing numbers in radio and other electrical circuits are produced, has, as is well known, three sets of crystallographic axes commonly known as the X or electrical axes, the Y or mechanical axes and the Z or optical axis, respectively. The piezoelectric plates are cut from the raw quartz at various (but highly significant) orientations with respect to one or more of the natural axes. For example a plate may be cut from the raw quartz crystal so orientated that the major surfaces of the plate are parallel to an electrical axis of the crystal and inclined a definite amount and in the proper sense with respect to the optical axis. It will be apparent, therefore, that at certain points in the production of quartz piezoelectric plates it may become necessary to determine the direction and sense of certain of the natural axes of the portion of quartz being used. Further, since two varieties of twinning, i. e., electrical and optical, are commonly found in quartz and since the twinning affects the sense, but not the direction, of the crystallographic axes, it is also necessary during the cutting process to detect the twinning, if it exists, and to locate the boundaries between twins whereby the quartz piece to be cut may be marked off into separate homogeneous regions. The arrangement herein disclosed permits the ready detection of the presence of twinned regions and location of the boundaries thereof. After the performance of this step the arrangement of the present invention then permits the determination, in one region at a time, of the directions and senses of axes or cuts to be made therefrom, or the sense of cuts already made therefrom, or the electrical sense or optical handedness of quartz specimens.

The arrangement of the present invention, in one embodiment, permits the direction of the X axes of a "Z" cut quartz section to be readily determined as well as the electrical sense (polarity) of each X axis. This information together with a knowledge of the handedness of the portion (which also may be determined by use of the arrangement herein disclosed) determine the direction and sense of angular displacement from the optical axis of plates to be cut therefrom.

In accordance with another embodiment, the arrangement of the present invention permits the direction of the Z axis of an "X" cut quartz section to be readily determined as well as the direction and sense, i. e., the angular displacement from the optical axis, of plates to be cut therefrom.

As used herein, "Z cut section" refers to a section so cut from the raw quartz crystal, commonly referred to as the "mother crystal" that the major surfaces of the section are perpendicular to the Z axis of the crystal while "X cut section" refers to a section so cut that the major surfaces are perpendicular to an X axis of the crystal. A section is ordinarily from ½ inch to 2 inches in thickness and is usually cut into "slabs" (relatively thin portions whose thickness is somewhat greater than that of the desired finished plate) or "bars" (relatively long and narrow portions whose smallest cross-section is somewhat greater than the major face dimensions of the finished plate). The slabs are diced into the final wafers or plates while the bars are "loafed" or sliced into such plates.

The quartz specimen is normally first examined for twinning by use of the arrangement contemplated by the invention as pointed out above and marked off into homogeneous regions sufficiently large for practical use; it is only such usable regions that are normally examined subsequently for direction and sense of crystallographic axes or desired cuts etc.

A feature of the present invention is the location of a light diffusing element closely adjacent to an illuminated pin hole and remote from the actual primary source of light; the illuminated pin hole acts as a secondary source of light for the quartz specimens being examined.

Another feature of the invention resides in the provision of matching and marking arms which may be used in a cooperative manner in aligning and marking the crystal section.

In accordance with a specific embodiment of the invention, a crystal section supporting table is provided having an aperture of pin hole dimensions passing therethrough, the crystal specimen to be examined being supported on the table over the pin hole aperture. A source of light is provided together with an optical system for concentrating the rays of light onto the light diffusing element and thence through the pin hole into the quartz section. At least one major surface of the crystal section to be observed should be previously prepared by etching, for example by use of hydrofluoric acid. As the observer "views" the illuminated pin hole through the upper etched surface of the quartz section he will see a "figure" which appears to be located down in the section (as when looking at objects under water). If the portion of the section being examined is untwinned, the figure will be, roughly, a three pointed star and its orientation on the section is definitely related to, and therefore will be an indication of, the direction and the sense of the three electrical axes of the section. Two viewing screens carried by flexible arms are provided (one for right-hand quartz and the other for left-hand quartz) and the proper screen is brought into position and the quartz section is rotated the required amount to bring the "figure" into alignment with guide lines provided on the respective screens. A marking template also carried by a flexible arm is next brought into position and the direction and sense of the electrical axes are marked on the section in accordance with guides provided by the template.

Complete understanding of the arrangement and operation of the devices contemplated by the present invention may be gained from consideration of the following detailed description and the accompanying drawings in which:

Fig. 1 is a side elevational view of an optical testing device embodying features of the present invention, a portion of the side walls being broken away to reveal the interior arrangement;

Fig. 2 is a plan view of the device of Fig. 1;

Fig. 3 shows the relative positions of the matching and marking arms of a first embodiment of the invention and shows the matching arm for one handedness of quartz in operative position;

Fig. 4 shows the marking arm of the first embodiment of the invention;

Fig. 5 is a view similar to that of Fig. 3 except for the fact that the matching arm for the opposite handedness of quartz is shown in operative position;

Fig. 6 shows the type of "figure" seen in a Z cut crystal section when examined in the apparatus of Fig. 1, the three guide lines of the matching arm being indicated by dotted lines;

Fig. 7 shows the section illustrated in Fig. 6 after rotation to bring the "figure" into alignment with the guide lines of the matching arm;

Fig. 8 shows the crystal section after marking to indicate the X axes by use of the marking arm;

Fig. 9 is a view from below of the arm provided for holding the light diffusing element in position, the normal position of the element with respect to the aperture in the arm being indicated by dotted lines;

Fig. 10 shows one marking arm of a second embodiment of the invention;

Fig. 11 shows the matching arm of said second embodiment;

Fig. 12 shows the second marking arm of the second embodiment;

Fig. 13 shows a crystal section after marking to indicate the direction of the Z axis and the sense of cut for a standard crystal plate;

Figure 14:
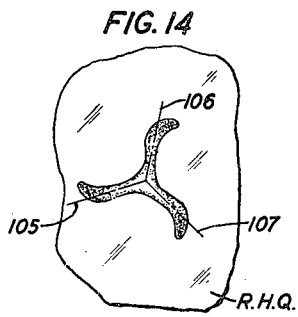
Fig. 14 shows the type of "figure" seen in a Z cut crystal section of right-handed quartz in the event the etching process has been continued for a comparatively long period before examination of the section.

Referring now to the drawings and first to Figs. 1 to 5, inclusive, there is illustrated a rectangular base plate 11 upon which are mounted lamp housing 13, which is a box-like enclosure, and lens and mirror assembly housing 14, which is also a box-like enclosure. Housing 14 is provided with a hinged cover which, when closed, forms a sloping support or table designated 15. It will be understood that base plate 11, which is shown broken away, may be extended to support a power transformer or other associated equipment. Housings 13 and 14, which are slightly separated so that the heat from the ventilated lamp housing 13 may be isolated from the optical housing 14, together form a substantially light impervious optical system when table 15 is in closed position.

Three arms, matching arms 21 and 22 and marking arm 23, are mounted on table 15, each arm being hinged and the relative positions of the three being such that any one may be swung down into front or operative position while the other two are in rear or non-operative position wherein they do not interfere with the use of the operative arm; in Figs. 1, 2 and 5 arm 22 is shown in operative position; in Fig. 3 arm 21 is shown in operative position and in Fig. 4 marking arm 23 is shown in operative position.

Aperture 24, which is of pin hole proportions, is provided in the upper surface of table 15; this small aperture is enlarged in the lower surface of the table sufficiently to contain disk 25. Disk 25, which acts as a light diffuser element, may comprise a disk of optical glass with an enameled face. (This is often referred to as "flashed glass".) The enameled face of the disk is placed up, i. e., toward the aperture 24. As shown in Fig. 1, the upper defining wall of the larger portion of aperture 24 is tapered whereby only the peripheral portion of diffuser disk 25 is contacted thereby and a space is left between the central surface of the disk and the aperture. This space serves two main purposes, first, it permits a wide angle of illumination through the pin hole and, second, it provides a reservoir wherein dirt may accumulate so that the unit need be cleaned less frequently than would be the case otherwise.

Lamp 41 is mounted in lamp housing 13, being supported by bracket 42. The two screws clamping bracket 42 to housing 13 pass through holes which are considerably oversize whereby the bracket may be moved about to accurately focus lamp 41 with respect to pin hole aperture 24. The arrangement is such also that the lamp may be readily removed for cleaning or replacement. Bracket 43 is mounted in the upper portion of lamp housing 13, the longer arm thereof extending out between lamp 41 and the ventilation hole in the top of the housing and acting as a light shield.

Lamp 41 is provided with suitable conductors 44 and 45 (shown in part only) for connection to the energizing circuit which may include a power transformer, preferably supported on an extension of base 11, a suitable control switch and other associated parts.

Two plano-convex lenses, 45 and 46, are positioned in lens assembly housing 14. Each lens is provided with a lens holder (holder 47 provided for lens 45 and holder 51 for lens 46) and the two holders are so held together by means of bolts 52 and 53 and face plates 54 and 55 that a compact and unitary assembly results, lenses 45 and 46 being held with convex surfaces toward each other. The lens assembly is normally held in the position illustrated in Fig. 1 by side strips 56 and 57 and two similar, but oppositely located, side strips that are not shown and by bottom strip 71 and a similar, oppositely located, bottom strip not shown. The assembly may be readily removed, however, by lifting it up out of the holding strips after first raising table 15; after removal of the lens assembly the outer surfaces of the lenses may be readily cleaned.

Light reflecting mirror 72 is angularly positioned in lens assembly housing 14, being supported on bracket 73 and by strip 74 and a similar, but oppositely positioned, strip that is not shown. Stop member 75 mounted on the lower edge of bracket 73 prevents the mirror from sliding downward along the surface of the bracket while spring member 76 normally prevents retraction of the mirror along the surface of the supporting bracket. However, the mirror may be readily removed for cleaning or replacement by first moving table 15 to open position and then pressing down the free end of spring 76 a sufficient amount to permit the mirror to clear the edge of the spring as it is retracted.

Light diffusing disk 25 is normally held in the position illustrated in Fig. 1, i. e., in the enlarged aperture beneath pin hole 24, by arm 81 which is rotatably attached to the under surface of table 15 by screw 82. Arm 81 is provided with aperture 83 which normally permits passage of light to disk 25. Aperture 83 is of slightly less diameter than disk 25 so that arm 81 when in normal position is effective to hold the disk in position and yet has substantially no blocking effect thereon with respect to light rays. Arm 81 is normally held in the position illustrated in Fig. 1 through registry of pin 84 in an aperture provided in the under surface of table 15. Arm 81 may be rotated about screw 82 on occasion, however, by first pulling down the free end of the arm sufficiently to disengage pin 84 from the aperture, whereby disk 25 may be readily removed and any dirt or quartz particles which may have fallen through aperture 24 cleaned away.

It will be clear from the above description that the various parts of the assembly, particularly the diffusing disk, the pair of focussing lenses and the reflecting mirror, are all readily removable for cleaning and replacement.

In order to further describe the invention let it be assumed that it is desired to check for twinning and to determine the direction of the electrical or X axes of a "Z" cut piezo-electric section and to determine the direction and sense of desired cuts. At least the upper surface of the section should first be prepared, for example, by grinding and etching or by etching alone in the instance of a sawn surface. (The etching process may utilize, for example, a 48 per cent hydrofluoric acid for a period of twenty minutes or a weaker solution of the acid for a longer period or other well known fluorine etching compounds). The section 101 to be tested is then placed in position on table 15 as shown in Figs. 1 and 2 being located over aperture 24.

The examination for twinning and the marking of the twinned regions, if any, are usually carried out at this point before the homogeneous usable regions are examined for axes. However, since the steps of the examination for twinning are more readily explainable after the orientation process has first been explained, it will be assumed for the moment that section 101 is free of twinning. It will be assumed, further, that it has been determined by previous tests, that section 101 is left-handed quartz, and has been marked with two saw notches to indicate this handedness. (As used herein, "right-handedness" refers to quartz which when examined in the conoscope results in expanding optical rings when the conoscope eyepiece polarizing element is rotated clockwise while "left-handedness" refers to quartz which under similar conditions results in contracting optical rings.)

It might be pointed out here that if the etching time referred to above be doubled the previous test for handedness will then be unnecessary as the "figures" obtained (to be described later) will also indicate the handedness.

Lamp 41 is now energized and the pair of lenses 45 and 46 and mirror 72 are effective to concentrate the resulting light rays through diffusing disk 25 and pin hole aperture 24. Matching arm 22 (the matching arm for use with left-handed quartz, which has been marked with two notches to indicate use of the number "2" arm) is now swung down into operative position over section 101 (as shown in Fig. 2). It might be pointed out here that arm 22, and the other matching and marking arms, are comprised, at least for a portion of their length, of flexible material so that the free end of the arm may be brought into close engagement with the upper surface of the crystal section regardless of the thickness thereof.

An aperture, 102, is provided in arm 22 near the free end thereof. Plate 103 (Fig. 1), which is provided with an aperture similar to aperture 102, is attached to the free end of arm 22 by four screws or other suitable means, being so positioned that the aperture in the plate is in registry with aperture 102. Matching plate 104, which is of suitable transparent material, is clamped between plate 103 and the end of arm 22. Plate 104 is provided with three properly oriented guide lines 105, 106 and 107 which radiates from a common center point at intervals of 120 degrees. Plate 104 is so positioned that the common center point of the three guide lines coincides with the center of aperture 102, the center of the aperture in plate 103 and pin hole 24. The assembly provided at the free end of matching arm 22 might well be referred to therefore as a matching guide.

Now as the observer peers down through the apertured end of matching arm 22 (the arm, as stated above, having been brought down into contact with section 101) and views pin hole 24, now illuminated, he will see a "figure" which may be compared, roughly, to a three-pointed star or to an equilateral triangle in shape and which will appear to be located between the upper surface of section 101 and the pin hole itself. (Observance of this general type of "figure" is referred to in a bound booklet by Armand de Gramont, "Recherches sur le Quartz Piezoelectric," Paris Ed. de la Rev. D'Opt. 1935.) Upon detecting the "figure," the observer then checks the alignment of its three "lengths" or axes with guide lines 105, 106 and 107. One of the many possible results of the check is indicated in Fig. 6 where it wil be seen the "figure" is misaligned with respect to the guide lines. The observer now rotates section 101 until he brings the "figure" into substantial coincidence with guide lines 105, 106 and 107, that is with the guide lines substantially as bisectors of the respective apices of the figure. This position is indicated in Fig. 7.

Now that section 101 has been orientated properly on table 15, the observer swings matching arm 22 back out of the way and brings marking arm 23 down into operative position over section 101. The marking arm is similar, generally, to matching arm 22 but differs therefrom in that a plate 111 is attached to the free end thereof by means of three screws, or other suitable fastening means. Plate 111 is provided with a properly oriented Y-shaped cut-out template or marking guide 112, in which the three guide lines are again 120 degrees apart.

The observer now places the point of a pencil or other suitable marking stylus in cut-out template 112 and marks the outline thereof on the surface of quartz section 101. The section so marked is shown in Fig. 8. It is known to the observer that the respective X axes are parallel to the marked lines and he knows therefore that certain plates, for example, the BT cut plate, may be cut parallel to any one of the lines. (The BT cut plate as disclosed in Patent 2,218,225 issued to me on October 15, 1940 is produced by so cutting the plate with respect to the axes of the crystal that the principal faces of the plate are parallel to an X axis of the crystal and are oriented or inclined at an angle of approximately −49 degrees with respect to the Z axis.

While the orientation of the figure or pattern seen in the quartz section is, as stated, an indication of the direction of the X axes and said axes are located with reference to the apices of said figure, they do not exactly coincide with the apices but are slightly to one side. That is, the figure is rotated a slight, but definite, amount (of the order of 10 degrees to 15 degrees) away from the true direction of the X axes of the section, this rotation being in a clockwise direction for left-hand quartz and in a counter-clockwise direction for right-hand quartz. The orientation of the guide lines on matching arm 22 with respect to that of the marking guide on the marking arm and the orientation of the guide lines on matching arm 21 with respect to said marking guide are such as to compensate exactly for the "error" between the figure and the true direction of the X axes in left-hand quartz and right-hand quartz respectively.

It will be understood that, in the above example, had the quartz section being examined been right-handed quartz (and marked so by one saw notch), matching arm 21 (bearing the numeral "1") would have been used instead of matching arm 22 and that, otherwise, the test would have been carried out as described. The arrangement of matching arm 21, including the assembly of the matching guide, is similar to that of matching arm 22.

Now all sections, whether of right-handed or left-handed quartz, when marked with the three radial lines as in Fig. 8, are sufficiently marked to permit choosing the direction and sense of cuts such as the BT cut referred to above. If the section, so marked, be turned so that the eye looks along any one of the three electric axes with said axis pointed toward the observer then the sense of a BT cut through the section is from upper left to lower right. The X axis actually selected is determined by the fact that it is often more economical from the standpoint of usable material to cut parallel to a particular one of the X axes rather than another.

Figure 15:
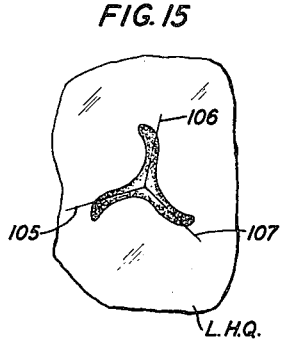
Fig. 15 shows the type of "figure" seen in the event the section of Fig. 14 has been left-handed quartz.

In the event that the etching process be continued for a longer period, as noted above, in order that an indication of handedness may be obtained, the "figure" seen in the Z cut section will then be as shown either in Fig. 14 or Fig. 15. The "figure" of Fig. 14 is that obtained if the quartz is right-handed and shows clockwise "swirls" while the "figure" of Fig. 15 is that obtained if the quartz is left-handed and shows counter-clockwise "swirls."

If this method of determining the handedness of the quartz which involves the more developed "figures" is to be followed, then the designations "1" and "2" on arms 21 and 22 respectively may well be replaced by a copy of the respective "figures" shown in Figs. 14 and 15.

The alignment of the "swirl figures" with the guide lines of the matching arms is exactly the same as that described above with reference to Figs. 6 and 7 except for the fact that we neglect the "swirl" portions of the "figure" when aligning.

Figure 16:
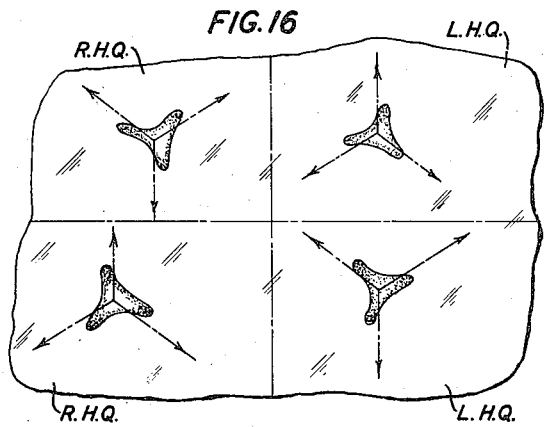
Fig. 16 illustrates a hypothetical Z-cut section of quartz and shows the relationship of the "figures" to the sense of the X axes and to the handedness of the quartz.

Considering now the use of the arrangement for detecting twinning as mentioned briefly above, it might be pointed out first that the "figure" of Figs. 6 and 7 is not identically aligned with the X axes of the quartz section. Actually the "figures" are out of alignment with respect to the X axes by 10 degrees to 15 degrees and their sense and sense of misalignment are related to the sense of electric axes and to the handedness of the quartz as shown in Fig. 16. There is illustrated in Fig. 16, a hypothetical section of quartz in which there are four different regions exhibiting the four possible variations of electric sense and handedness that might be simultaneously exhibited in a twinned quartz section. In all cases the electrical axes of each portion are parallel to those of another portion but may be of opposite sense. As here illustrated the respective arrow point ends of the axes are the ends which would be electrically positive (+) by tension.

Figure 17:
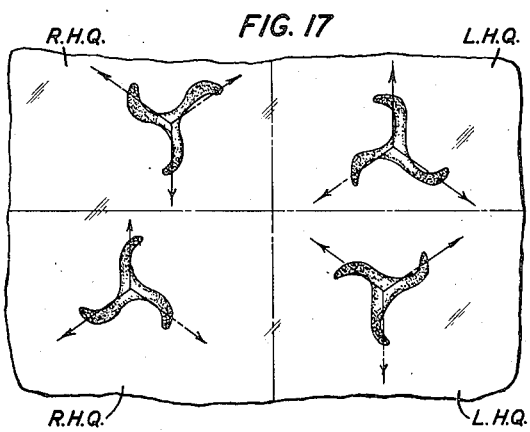
Fig. 17 is similar to Fig. 16 but shows the types of "figures" occurring when the etching process has been continued for a comparatively long period of time.

The section illustrated in Fig. 17 is similar to that of Fig. 16 except that in this instance the etching process has been continued for a longer period as discussed above in order that "swirl figures" may be produced.

Now it will be clear that if a section such as that shown in Fig. 16 or 17 be placed on table 15 with a boundary of any two different regions directly over pin hole 24, the observer would then see parts of two different "figures" instead of a single figure. Twinning is easily detected if present in a section, therefore, by shifting the section about on table 15 with respect to pin hole 24 and observing whether or not any "mixed figures" occur. Actually the boundary line itself will stand out clearly and may be traced on the surface of the section with a pencil or other suitable marking stylus so that the size and shape of the several regions may be inspected for economy of cutting. A finished piezoelectric plate must be cut entirely from one region and must not cross a boundary.

When observing relatively thick, parallel faced sections for detection of twinning, it is often advantageous to check both faces of the section for twinning in order to note whether twinning boundaries go approximately straight through the section or whether they slant off to a side of the section.

After the inspection for twinning and after the twinned regions, if any, have been marked, all usable regions may then be tested for direction of axes and sense of cut as outlined above.

Figure 18:
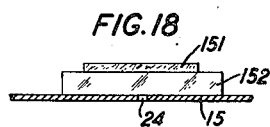
Figs. 18, 19 and 20 show alternative methods of mounting a specimen on the table.

Applicant has determined that the size of the "figure" seen is proportional to the thickness of the crystal section and that, when the "figure" is small as with very thin quartz sections, larger "figures" may be obtained by placing a thick piece of plate glass on the table under the crystal section. In such event, however, it is necessary to polish the under-side of the section or, more simply, to wet it with a liquid having a refractive index matching that of quartz, for example, between 1.53 and 1.56. Fig. 18 illustrates a relatively thin quartz section 151 supported over aperture 24 of table 15 by a relatively thick piece of plate glass 152.

Figure 19:
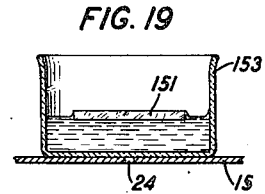
Figure 20:
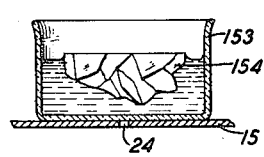

If desired, section 151 may, as shown in Fig. 19, be immersed in a liquid, which has a refractive index matching that of quartz, in a glass vessel 153 and the vessel positioned over the pin hole aperture in table 15. This latter method is particularly applicable in connection with sections which have only one flat top surface; Fig. 20 shows such a section 154 in position for testing.

In addition to the obvious advantageous features of the arrangement described such as accessibility and removability of the various parts, compactness, absence of complicated moving parts, adaptability to comfortable "bench" use from a sitting position and adaptability to accurate use by unexperienced persons, particular attention is directed to the novel arrangement whereby the light diffusing element (disk 25) is placed under and directly adjacent to the pin hole (aperture 24) and at a distance from the light source 41. Considerable and important advantages result from locating the light diffusing element adjacent to the pin hole rather than locating it at a distance from the aperture as has been the practice heretofore; one arrangement proposed heretofore, for example, involved utilizing the coated surface of the light source bulb itself as the diffusing element. With the light diffuser located adjacent to the pin hole as contemplated by the present invention, preparation of the under surface of the quartz section to be examined is quite unimportant and it may be ground, polished, etched or oiled as convenient and as incidental to the grinding and etching treatment usually applied to the upper surface of the section or it may be mounted in a glass dish of oil or other suitable liquid. Further, with this novel arrangement a concentrated beam of light is sent through the pin hole and strong "figures" are seen even under "daylight" working conditions.

In addition to use in determining and marking the direction of the X axes and direction and sense of cuts from a "Z" cut section, the arrangement of the present invention may also be used for observing twinning and for determining and marking the direction of the Z or optical axis of an "X" cut quartz section and the sense of the angular cuts to be made from these sections. For such use a different set of matching and marking arms is used, the arms of this set being illustrated in Figs. 10, 11 and 12.

In order to illustrate the operation of the arrangement for this latter purpose let us assume that "X" cut quartz section 130 be placed on table 15 and matching arm 131 brought down into operative position thereover as shown in Fig. 11. It will be assumed that at least the upper surface of the section has first been prepared, for example, by grinding and etching or by etching alone as referred to above. Arm 131 is provided at its free end with window 132 of suitable transparent material; two parallel lines 133 and 134 are provided on this transparent material. This arrangement may well be referred to as a matching guide.

Now as the operator, using the testing arrangement in the same general manner as described in detail above, peers down through window 132 he will see a "figure" in section 130. The figure in this instance, however, will not be the same as those described above as seen in the "Z" cut section but will be similar to one of the four figures 135, 136, 137, 141, which are reproduced on matching arm 131 as guides.

It will be noticed that, while the "parallelogram" figures 135 and 137 and the H figures 136 and 141, respectively, are of generally similar outline, they are mirror images and are easily distinguishable one from the other. Figures 136 and 141 are easily distinguishable due to the fact that the longer angular "toes" extend in respectively different directions as do the respective pairs of tilted parallel lines while figures 135 and 137 are distinguishable due to the fact that the respective "high" sides are oppositely positioned. It might be noted that such figures are obtained, for example, by etching in 48 per cent hydrofluoric acid for 20 to 60 minutes, but that if the etching is continued for hours the appearance of the figures changes completely through addition of new lines to the figure as well as through loss of some of the lines here shown.

Assuming now that a "figure" similar to either 135 or 136 is seen, the two arrows provided on matching arm 131 indicate that the right-hand marking arm, i. e., marking arm 142, (Fig. 12) should be used in this particular case. The two longer, vertical sides of the figure are first lined up with lines 133 and 134 of matching arm 131 by rotating crystal section 130 after which matching arm 131 is swung back out of the way and marking arm 142 is brought down into operative position over crystal section 130 as shown in Fig. 12. Using edge 143 of the marking arm as a guide a line is then marked on crystal section 130 with a pencil or other suitable marking stylus. This line (line 144 of Fig. 13) indicates the direction of the optic or Z axis of the quartz crystal. Using cutout portion 145 as a template or marking guide a second line (line 146 of Fig. 13) may be drawn on the crystal section, this line indicating the sense, or direction, of the angular cuts to be made from the section. The angle of the cut-out portion provided on the matching arm will be in accordance with the particular cut of the plates to be produced from the section. In the present instance it is assumed that plates of the type commonly referred to as BT cuts are to be produced; this plate as mentioned above is disclosed in Patent 2,218,225 issued to me on October 15, 1940, and is produced by so cutting the plate with respect to the axes of the mother crystal that the principal faces of the plate are parallel to an X axis of the crystal and are orientated or inclined at an angle of approximately −49 degrees with respect to the Z axis. The angular position of cut-out portion 145 as well as that of the cut-out portion provided in matching arm 147 (Fig. 10) are established accordingly. It will be understood that for other standard cuts, wherein the orientation differs from that of the BT cut referred to, the angular position of the cut-out portions may be varied accordingly, or the orientation may even be determined from the above marking.

It will be understood that, in the above instance, had either figure 137 or 141 been seen in section 138, then the left-hand marking arm (arm 147, Fig. 10) would have been used as the arrows associated with figures 137 and 141 point to the left.

Figure 21:
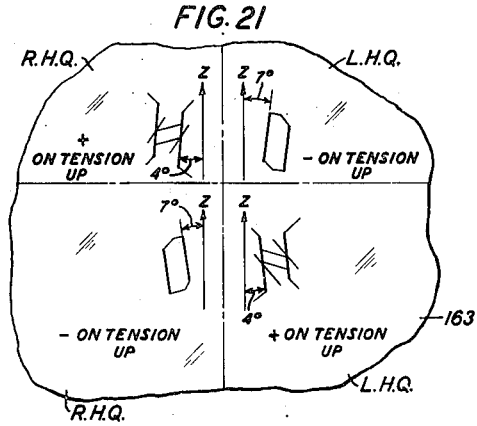
Fig. 21 shows the relationship between the different types of "figures" and the four possible different types of twinning in an X cut quartz section.

If section 138 had been twinned (a fact which, of course, would have been previously determined as in the instance of section 101) parts of the two "figures" shown in Fig. 11 would have been joined. Fig. 21 illustrates the actual relationship of four possible "figures" to the four possible conditions of twinning in an X cut section 163. It will be observed that the respective sides of the "H-shaped figures" are misaligned with respect to the Z axis by 4 degrees and that the respective sides of the "parallelogram figures" are misaligned with respect to the Z axis by 7 degrees; the average, 5½ degrees, is the inclination of the Z axis guide line 143 of arm 142 (Fig. 12) and the similar guide line of arm 147 (Fig. 10). It might be noted at this point also that in an X cut section, such as 163, when one surface is electrically positive (+) the opposite surface is negative (−), and that the "H-shaped figure" always occurs with the positive face and the "parallelogram shaped figure" always occurs with the negative face as in Fig. 21.

It will be clear from Fig. 21 and from previous description above that the embodiment of Figs. 10, 11 and 12 may be used for detecting and marking optical twinning and electrical sense of X cut quartz sections as well as direction and sense of cut.

While certain specific embodiments of the invention have been selected for illustration and detailed description, the invention is not, of course, limited in its application to these embodiments. For example quartz crystal cuts other than those specifically referred to may be examined as well as crystalline materials other than quartz. Further, the arrangement might be used in connection with study of the surface texture of manufactured transparent articles to determine proper surfacing operations. In applying the method to unknown cuts of crystals it is necessary only to determine the type of "figure" that is given by the particular specimen, to relate this figure to the predetermined crystallographic axes of the specimen and, with this knowledge, to then examine "figures" in other specimens to determine the axial relations. The surface of the specimen may be "prepared" in other ways than by etching, for example, it has been found that good "figures" may be obtained if the surface of the specimen is prepared by grinding. The arrangements contemplated may be used for examination of any type of section, bar, slab, wafer, plate or other shape of crystalline specimen (so long as it has at least one plane surface) of any orientation with respect to the crystallographic axis, for determining the direction and sense of crystallographic axes or preferred cuts or for detecting and marking twinned regions and the embodiments described should be taken as illustrative of the invention and not as restrictive thereof.

What is claimed is:

1. The method of locating the direction of one of the natural axes of a quartz crystal section that has been so cut from the mother crystal that at least one of the major surfaces of the section is perpendicular to a predetermined one of the natural axes of the crystal which comprises the steps of etching one of the major surfaces of the section, directing light successively through a light diffusing element, an aperture of pin hole magnitude and the other of the major surfaces of the section to produce a figure in the quartz section of definite configuration the orientation of which is definitely related to the direction of said one of the natural axes of the crystal section in that it is rotated a definite amount away from the direction of said one axis, observing the figure through the etched surface of the section, moving a matching guide having a plurality of straight guide lines thereon to a predetermined position coaxial with the said light diffusing element and the aperture and in contact with a surface of the quartz section, orientating the crystal section in order to align characteristic directional points of the observed figure with the guide lines provided on said matching guide, said characteristic directional points being rotated away from the direction of said one axis, moving said matching guide to a position out of contact with the surface of the quartz section and removed from the first-mentioned position, and moving a marking guide to a predetermined position in contact with a surface of the orientated section and coaxial with the light diffusing element and the aperture, said marking guide having a straight guiding edge, and utilizing said guiding edge of said marking guide and cooperating marking means to mark a line indicating the direction of the desired natural axis on the etched surface of the section, said matching guide and said marking guide being so orientated with respect to each other when in said respective predetermined positions as to compensate for said rotation of said figure with respect to the direction of said one axis, the compensation resulting in coincidence between the direction of said guiding edge and the true direction of said one axis.

2. The method of locating the direction of the X axes of a quartz section that has been so cut from the mother crystal that the major surfaces thereof are at right angles to the Z axis of the crystal which comprises illuminating the section to produce an optical pattern of triangular shape the orientation of which is definitely related to the direction of the X axes of said section in that it is rotated a slight, definite amount away from the true direction of said X axes, moving a matching guide to a predetermined position above said section, said matching guide bearing three straight aligning guide lines radiating from a common center point at intervals of 120 degrees, viewing said pattern through the portion of said matching guide which bears said aligning guide lines, rotating said section to cause each of the guide lines of said matching guide to be substantially coincident with a bisector of the respective angles of the triangular pattern, moving a marking guide to a predetermined position over said section, said marking guide bearing a slotted star pattern, and marking the direction of the X axes of said section by drawing lines with a suitable stylus projected through said star pattern, said star pattern and said aligning guide lines when the respective guide is in its said predetermined position having such relative angular displacement as to compensate for the angular difference between said bisectors and the true direction of the X axes, the compensation resulting in coincidence between the direction of the slots in the star pattern and the true direction of the X axes.

3. An optical device for locating and marking the X axes of a quartz crystal section that has been so cut from the mother crystal that the major surfaces of said section are at right angles to the Z axis of the crystal comprising an opaque plate having an aperture therein over which the crystal section can be placed and having a source of illumination behind the crystal section suitable for passing a beam of light into the lower face of the crystal section whereby to produce therein the usual characteristic triangular light pattern as viewed from the upper face of the crystal section, means for mounting said crystal section to be rotatable, the light pattern also rotating therewith, a pair of guide plates fixedly secured to said device and each constrained to move in a definite path whereby to bring said guide plates one at a time into the same position of registry with said crystal section above said section, the first of said guide plates having three guide lines meeting at a common point and diverging at angles of 120 degrees from one another to serve when in said position of registry as lines of reference of the optical axes of said section when the latter is rotated by the observer to bring said light pattern into an orientation at which said guide lines appear to bisect the apex angles of the light pattern, and the second of said guide plates having three slots therein in star configuration in such angular displacement, when said second plate is in its respective position of registry, from said lines of reference as to serve as a ruling guide for marking on the upper face of said crystal section the angular position of the X axes thereof.

GERALD W. WILLARD.

REFERENCES CITED

The following references are of record in the file of this patent:

UNITED STATES PATENTS

| Number | Name | Date |
|---|---|---|
| 2,157,437 | Shipley | May 9, 1939 |
| 2,218,489 | Gerber | Oct. 15, 1940 |
| 2,313,143 | Gerber | Mar. 9, 1943 |